Sept. 29, 1964   A. SANCIONI   3,150,883
SAFETY TRAILER HITCH
Filed Dec. 31, 1962

INVENTOR.
AURELIO SANCIONI
BY
Kimmel & Crowell
ATTORNEYS.

United States Patent Office 3,150,883
Patented Sept. 29, 1964

3,150,883
SAFETY TRAILER HITCH
Aurelio Sancioni, Rte. 1, Box 277, Corning, Calif.
Filed Dec. 31, 1962, Ser. No. 248,767
4 Claims. (Cl. 280—457)

This invention relates to a safety trailer hitch and has as its primary object the provision of an improved means for effectively securing a trailer tongue to a towing vehicle in addition to the usual ball and socket securing means which will positively preclude disengagement of the trailer from the towing vehicle in the event of failure or disengagement of the usual ball and socket means.

An additional object of the invention is the provision of an improved device which supplants the usual safety chain required by law in many jurisdictions and which is more effective and secure than such a chain.

An additional object of the invention is the provision of a safety device of this character which, upon accidental disengagement of the primary connecting means, will hold the trailer tongue and its associated towing vehicle tongue, if such is provided, in related assembly and upright position thus precluding the falling of the trailer tongue and preventing its engagement or digging into a road or pavement.

A further object of the invention is the provision of a safety trailer hitch of this character which, in the event of disengagement of the primary connecting means, will provide an effective safeguard against swerving of the trailer or disalignment thereof, such as could and frequently does occur when the sole safety device is a chain allowing relatively free play laterally of the trailer tongue.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing.

Similar reference characters refer to similar parts throughout the several views of the drawing.

Figure 1:
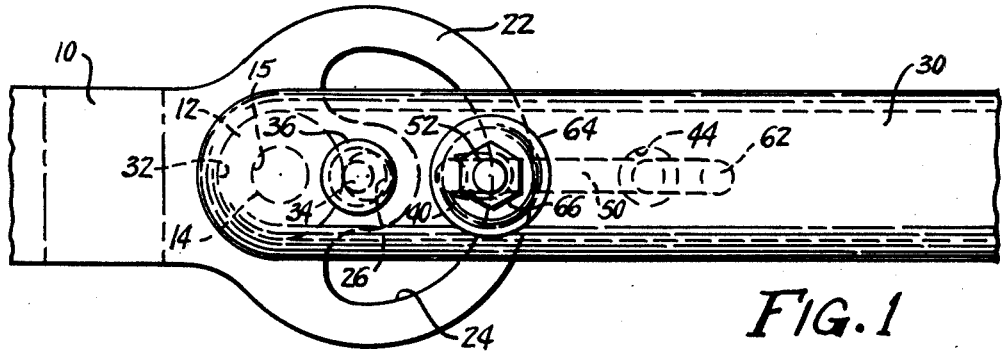
FIGURE 1 is a top plan view of one form of safety trailer hitch embodying the instant inventive concept.
Figure 2:
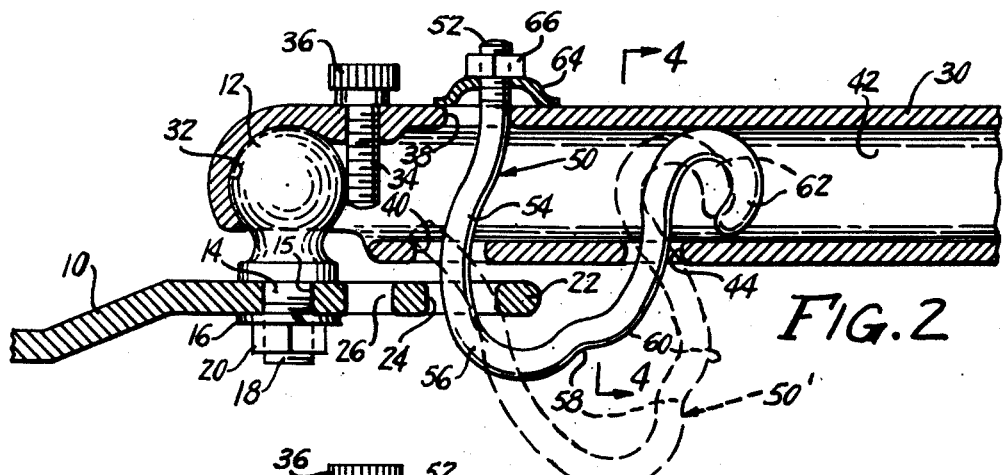
FIGURE 2 is a longitudinal cross-sectional view of the hitch of FIGURE 1, showing the unattached bolt in dotted lines.
Figure 3:
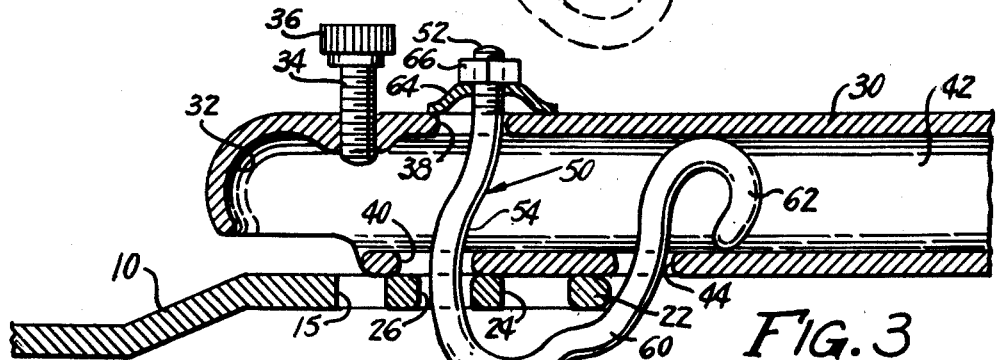
FIGURE 3 is a longitudinal cross-sectional view of the hitch as it would be used if the conventional ball were to be broken.

Having reference now to the drawings in detail, there is shown at 10 a tongue which is adapted to be secured to a towing vehicle in any desired conventional manner, and which is provided with the usual ball 12 comprising a part of the conventional hitch. The ball has the usual stem 14 extending through an aperture 15 in the vehicle tongue 10 and is provided with a lock washer 16, the stem being threaded as at 18 and secured in position by means of a nut 20. As best shown in FIGURES 1 and 2, a reinforcing end member 22 is secured to the tongue 10 in any desired manner or may be integral therewith. An arcuate slot 24 and an aperture 26 are defined in the end member 22 for a purpose to be more fully described hereinafter.

A trailer tongue is generally indicated at 30 and has formed in its end an arcuate ball socket 32 and a screw 34 having an operating head 36 is threadably secured therein to retain the ball 12 in the socket 32. The ball and ball clamp are conventional in apparatus of this sort, and normally serve to retain the trailer and towing vehicle tongues 30 and 10, respectively, in connected position. Heretofore, a safety chain has sometimes been connected between the tongues 10 and 30 as a further securing means. The instant invention obviates the necessity for the use of such a chain, and obviates many of its disadvantages, in that heretofore, when the primary securing means was accidentally released, the trailer tongue was permitted to fall and dig into the pavement, and the slack in the chain permitted the tongue to sway from side to side, thus disaligning the trailer.

In the instant invention the trailer tongue 30 is preferably hollow and has a pair of longitudinally offset apertures 38 and 40 defined in is top and bottom respectively and communicating with its interior 42. When the ball 12 is engaged in the socket 32, the aperture 40 is in substantial alignment with the arcuate slot 24 in the vehicle tongue 10. An additional aperture 44 is defined in the bottom of the trailer tongue 30 spaced rearwardly from the aperture 40 and communicating with the interior 42 of the trailer tongue 30 for a purpose to be further described hereinafter.

A bolt, generally indicated at 50, includes a straight threaded portion 52 integrally connected to a forwardly bowed portion 54 bent upwardly at 56, reversely bent at 58, and again bent upwardly at 60 where it is integrally connected to a hook portion 62. The bowed portion 54 and the bent portion 60 are separated by a distance sufficient to allow the latter to pass outside end member 22 when the former passes through the aperture 26 for a purpose to be further described hereinafter. The hook portion 62 is formed to have a height substantially equal to the diameter of the interior 42 of the trailer tongue 30 and larger than the aperture 44 to just barely permit the bolt 50 to be removed therefrom in a manner to be further described, but to normally retain the bolt 50 in place even when the hitch of the instant invention is not in use.

Suitable means are provided for retaining the bolt 50 in operating position, such as the dome-shaped washer 64 which seats over the mouth of aperture 38 and which is secured in position by means of the nut 66 engaging the threaded portion 52 of the bolt 50.

From the foregoing it will now be seen that so long as the bowed portion 54 of bolt member 50 is retained in substantially upright position by means of nut 66 in slot 24 and apertures 38 and 40, that hook portion 62 will be securely retained in the interior 42 of the trailer tongue 30 through the aperture 44, so that upon disengagement of ball 12 with socket 32, disengagement of tongues 10 and 30 will be positively precluded, although there may be longitudinal movement in slot 24 slightly to the rear.

Figure 4:
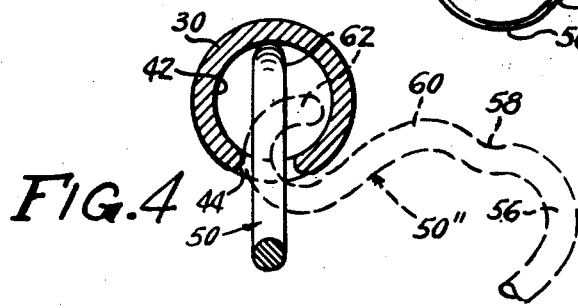
FIGURE 4 is a transverse cross-sectional view taken substantially along the line 4—4 of FIGURE 2 as viewed in the direction indicated by the arrows, showing the removal of the bolt from the hitch in dotted lines.

When nut 66 is released, the bolt 50 may fall to the position shown in dotted lines at 50' in FIGURE 2 wherein it may be tilted slightly so that it may be released from its engagement with the aperture 40 and slot 24, but the hook portion 62 is retained in the trailer tongue 30 unless it is purposely twisted through 90° to be removed in the manner shown in dotted lines at 50'' in FIGURE 4. Replacement may obviously be effected in the same manner.

The device of the instant invention is so designed that it will serve to hold the tongues 10 and 30 in assembled relationship over an extended period in case the ball 12 is broken during a journey. By passing the bolt 50 through the aperture 26 in the vehicle tongue 10 before extending it through the apertures 38 and 40 on the trailer tongue 30 by the washer 64 and nut 66, the end member 22 seats in the bent portion 60 and secures the hitch. Without this design, if the driver wished to continue his journey he would have to install a chain device such as described hereinabove.

While the trailer tongue 30 has been shown as hollow, it is to be understood that it could be solid and have a bore therethrough for passage of the bowed portion 54 of the bolt 50 and a recess or the like for insertion of the hook portion 62 of the bolt 50.

It will thus be seen that there is herein provided an improved safety trailer hitch which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A safety trailer hitch in combination with a trailer tongue having one end with a ball socket defined therein, means defining a bore having a top and a bottom opening in said trailer tongue, and means defining a recess having a bottom opening in said trailer tongue spaced from said bottom opening of said bore, a towing vehicle tongue having a ball thereon engageable in said ball socket and means defining an arcuate slot therethrough adjacent one end thereof, a bolt having a bowed portion engageable through said slot and said bore and having a hook portion engageable in said recess, said hook portion being larger than said bottom opening of said recess so that said bolt must be turned approximately 90° to disengage said hook portion from said recess, and means to retain said bowed portion in said slot and said bore.

2. A safety trailer hitch in accordance with claim 1 wherein said trailer tongue has a hollow interior and wherein said openings communicate with said interior.

3. A safety trailer hitch in accordance with claim 1 wherein said last-mentioned means includes a straight threaded portion on said bolt extendable through said top opening on said trailer tongue, and nut means engageable over said threaded portion.

4. A safety trailer hitch in combination with a trailer tongue having one end with a ball socket defined therein, means defining a bore having a top and a bottom opening in said trailer tongue, and means defining a recess having a bottom opening in said trailer tongue spaced from said bottom opening of said bore, a towing vehicle tongue having a ball thereon engageable in said ball socket and means defining an arcuate slot therethrough adjacent one end thereof, a bolt having a bowed portion engageable through said slot and said bore and having a hook portion engageable in said recess, and means to retain said bowed portion in said slot and said bore, said vehicle tongue further including means defining an aperture therethrough between said ball and said slot, said bolt further including a bent portion between said bowed portion and said hook portion, said one end of said vehicle tongue fitting between said bowed portion and said bent portion when said bowed portion is extended through said aperture on said vehicle tongue and said bore in said trailer tongue.

References Cited in the file of this patent

UNITED STATES PATENTS

| | | |
|---|---|---|
| 2,088,991 | Berchtold | Aug. 3, 1937 |
| 2,614,861 | Van Horn | Oct. 21, 1952 |